United States Patent
Hoffman

[11] Patent Number: 5,946,149
[45] Date of Patent: Aug. 31, 1999

[54] QUICK-RELEASE NON-DISTORTING REAR VIEW MIRROR ENHANCER

[75] Inventor: Ned Hoffman, Sebastopol, Calif.

[73] Assignee: Excel Innovations, Inc., Berkeley, Calif.

[21] Appl. No.: 08/725,730

[22] Filed: Oct. 4, 1996

Related U.S. Application Data

[63] Continuation-in-part of application No. 08/669,860, Jun. 10, 1996, abandoned.

[51] Int. Cl.$^6$ .................................................. G02B 5/08
[52] U.S. Cl. ....................... 359/854; 359/855; 359/872; 359/873; 359/874; 359/876
[58] Field of Search ........................ 359/854, 855, 359/872, 873, 874, 876, 878

[56] References Cited

U.S. PATENT DOCUMENTS

| | | | |
|---|---|---|---|
| 2,649,028 | 8/1953 | Lenta | 359/854 |
| 2,979,989 | 4/1961 | Calder | 359/854 |
| 4,486,075 | 12/1984 | Cohen | 350/603 |
| 4,487,479 | 12/1984 | Tolomeo, Sr. | 359/854 |
| 4,643,544 | 2/1987 | Loughran | 359/854 |
| 4,695,138 | 9/1987 | Epstein | 359/854 |
| 4,927,255 | 5/1990 | Martinez | 359/855 |
| 5,124,847 | 6/1992 | Gong | 359/854 |
| 5,165,081 | 11/1992 | Drumheller | 359/865 |

OTHER PUBLICATIONS

DE 3924–630 A Perkampus—Filed Jul. 26, 1989—Issued Jan. 31, 1991.

JP 3–125642 A Kamiya—Kamiya—Filed Issued—May 29, 1991.

Primary Examiner—Cassandra Spyrou
Assistant Examiner—Mohammad Y. Sikder
Attorney, Agent, or Firm—Ali Kamarei

[57] ABSTRACT

A non-distorting auxiliary rear view vision enhancing assembly which attaches onto an existing automotive interior main rear view mirror. The assembly comprises an auxiliary mirror shell having a front and back side with a non-distorting mirror placed on the front side, and a connecting arm connected to the back side of the auxiliary mirror shell for attaching the mirror shell to the main rear view mirror. In turn, the connecting arm has a ball joint pivot at substantially one end of the connecting arm and attached to the mirror shell. This provides for angular rotation of the mirror shell in the left and right, as well as the up and down tilt position. A spring loaded clamp is placed at substantially the end of the connecting arm opposite the ball joint pivot, for attachment of the connecting arm and the mirror shell to the main rear view mirror. Furthermore, the connecting arm has circumferential rotation means, so that the mirror shell can be rotated circumferentially around the clamp in substantially the same plane as the clamp.

6 Claims, 7 Drawing Sheets

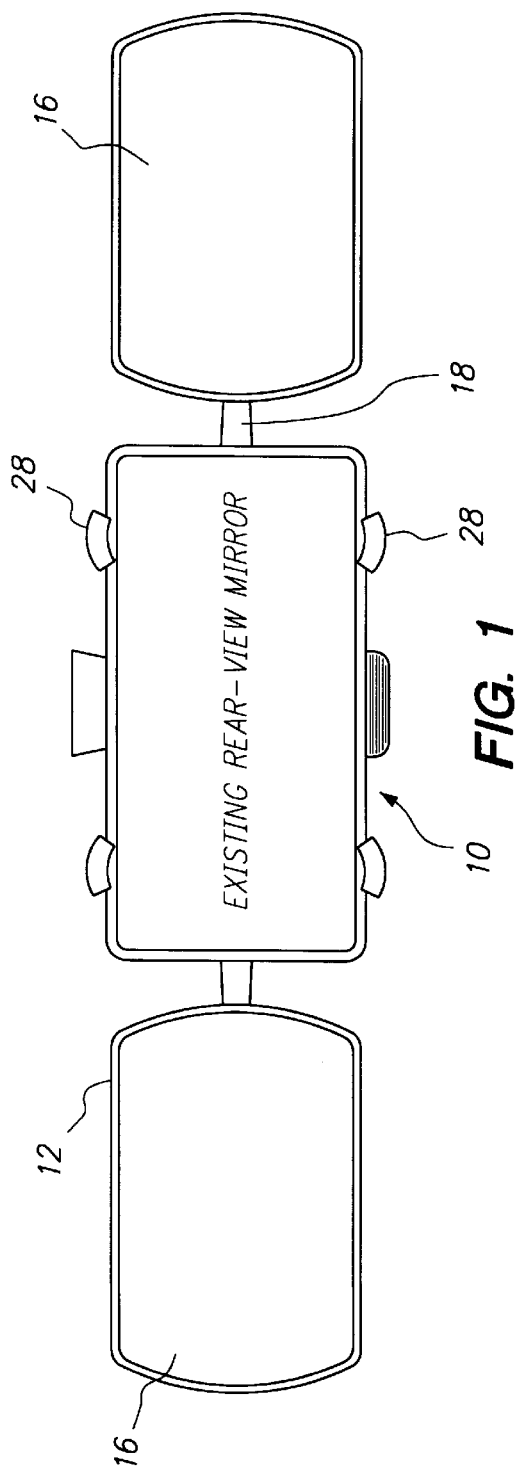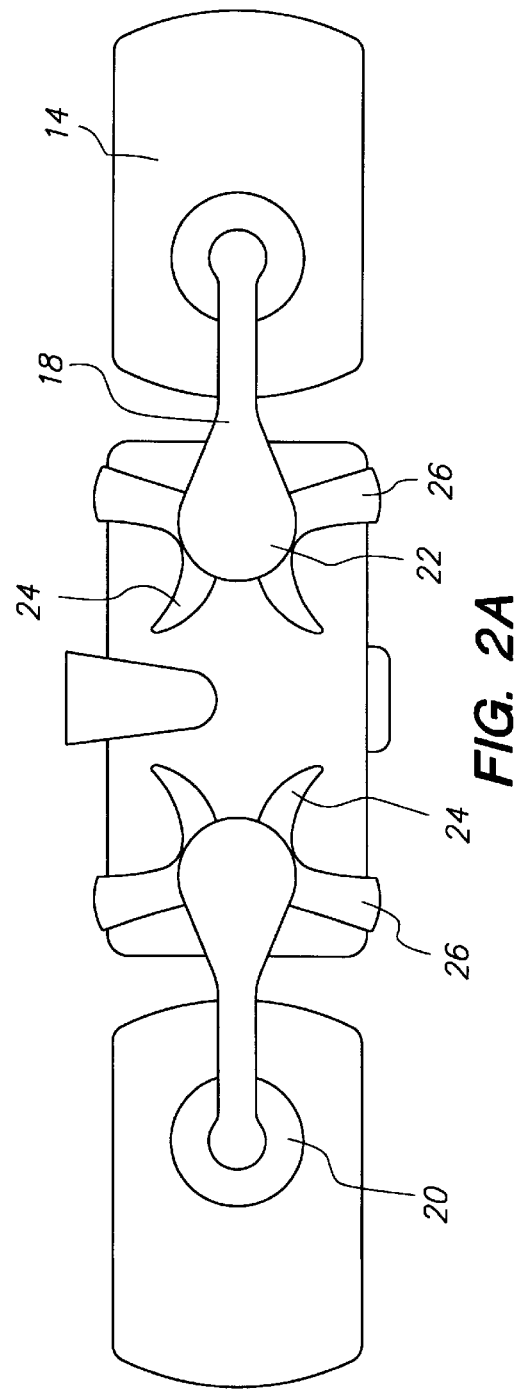

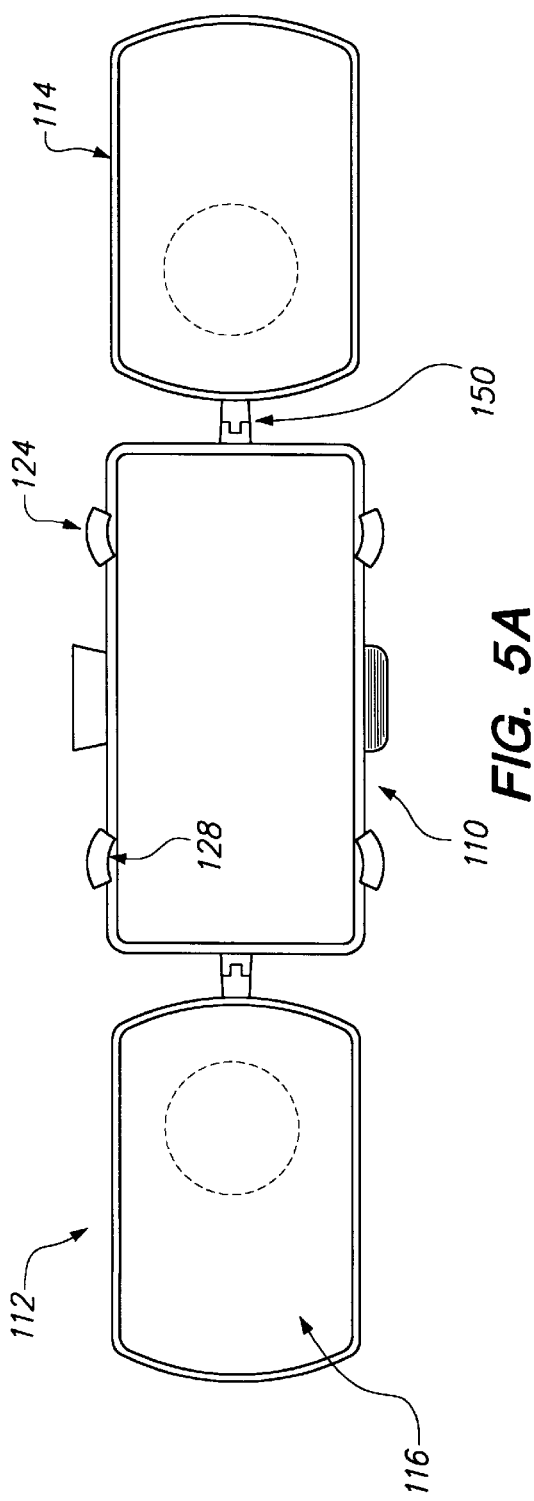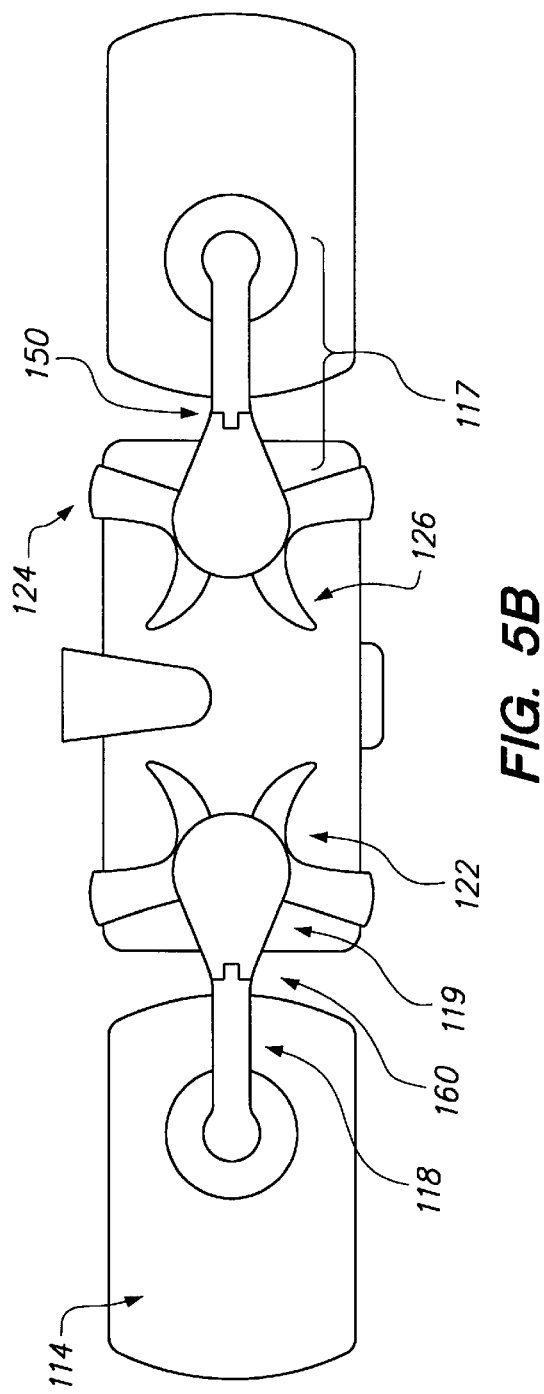

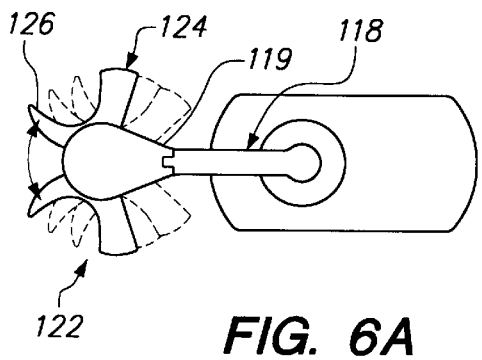
FIG. 6A
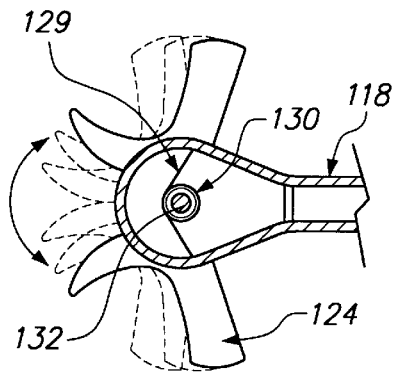
FIG. 6B
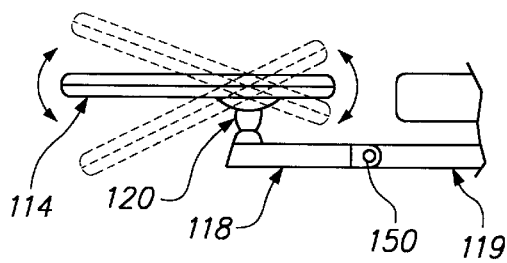
FIG. 6C
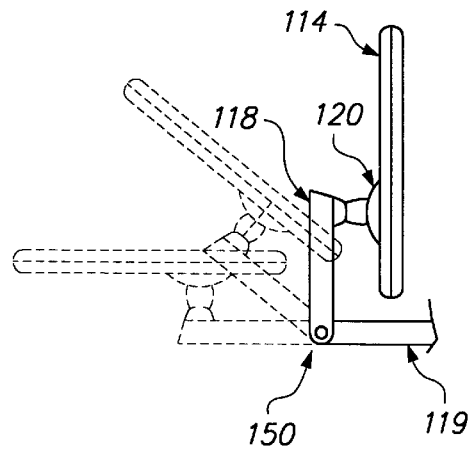
FIG. 6D
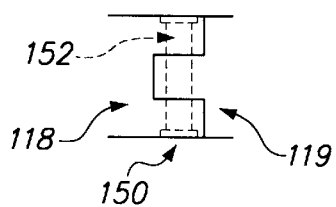
EIG. 6E
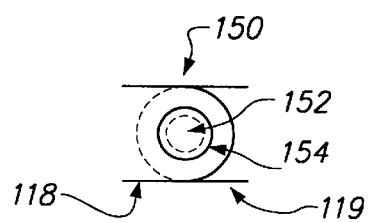
FIG. 6F

QUICK-RELEASE NON-DISTORTING REAR VIEW MIRROR ENHANCER

This application is a Continuation-In-Part application of U.S. patent application No. 08/669,860 filed Jun. 10, 1996, now abandoned.

FIELD OF THE INVENTION

The invention relates generally to rear view mirrors and particularly auxiliary rear view mirrors to reduce or eliminate driving blind spots.

BACKGROUND

Vehicles are typically provided with an inside rear view mirror that provides a view of the rear of the automobile. This view is generally limited and thus automobiles are also provided with two side mirrors placed outside of the car. One of these side mirrors is typically located on the right side of the car and the other one on the left. Most of what occurs behind an automobile can be observed by the driver. However, the combination of these mirrors is deficient in that blind spots or areas where a driver cannot see, still exist. Consequently, other automobiles or traveling objects, that are located within these blind spots cannot be seen. In order to eliminate these blind spots, large, cumbersome mirrors must be drilled into the roof of the automobile and the current rear view mirror must be removed. Also, distorting side rear view mirrors have been employed. However, because these mirrors are distorting, a driver can not accurately estimate the distance between such cars and other objects and his or her own automobile. Furthermore, objects tend to have distorted and contorted shapes, thus it is difficult to see objects within the blind spots. Therefore, in an attempt to solve the problem of blind spots, distorting rear view mirrors create other handicaps for drivers.

To be able to see objects within the blind spots, drivers are required to turn their heads in the lateral and backwards direction of the direction which they are travelling in order to see whether such automobiles or objects exist in the blind spots. Unfortunately, the act of looking laterally and backwards while traveling forwards requires a driver to momentarily look away from the forward direction. At speeds of 55 MPH and higher, this even momentary lapse in observing what is going on in front of the drivers can be fatal. Furthermore, many individuals have difficulty in turning their heads and for others with physical disabilities or age this task can be next to impossible.

These problems have contributed to an extraordinary amount of loss of life and property. Many accidents and fatalities have been caused because of blind spots or because drivers had been looking away from the forward direction of travel.

Others have tried to address this problem such as the invention described in U.S. Pat. No. 4,927,255. However, these inventions are expensive to manufacture as they require numerous parts and special manufacturing. Furthermore, during driving, there are often times when it is desirable and indeed necessary for a driver or passenger to use the automobile's sun visor. The conventional auxiliary rear view mirrors, such as that described by Martinez in U.S. Pat. No. 4,927,255, cannot be used with automobile sun visors. Once the sun visor is pulled down, the sun visor will block the view of the auxiliary mirrors and there is no way to move the auxiliary mirror from the path of the sun visor. Unfortunately, these inventions have failed to provide a satisfactory solution to the continuing problem of eliminating blind spots.

There is clearly a need for a safe, effective, and affordable means of eliminating or reducing blind spots for rear view mirrors. Such a solution should not only be effective, but it must be efficient to manufacture, cost-effective to produce, and accommodate the use of other automobile parts. It must also be easy to adapt for use in retrofitting the many different existing rear view mirrors currently in use.

SUMMARY

Therefore, it is an object of the invention to provide an auxiliary rear view mirror for eliminating or reducing blind spots for drivers when viewing the rear and sides of the automobile they are driving in.

It is another object of the invention to provide an auxiliary rear view mirror for eliminating or reducing blind spots that is easy to install and allows easy adjustment of the auxiliary mirror for use in conjunction with an automobile's sun visor.

It is a further object of the invention to provide an auxiliary rear view mirror for eliminating or reducing blind spots that is structurally effective and efficient to manufacture.

Yet another object of the invention is to provide an auxiliary mirror that does not require substantial maintenance.

A further object of the invention is to provide an auxiliary rear view mirror that can be effectively added to existing rear view mirrors.

A further object of the invention is to reflect objects in the blind spots in proportion as to how they appear naturally and without distortion.

The invention meets these objects by providing a non-distorting auxiliary rear view vision enhancing assembly which attaches onto an existing automotive interior main rear view mirror. The assembly comprises an auxiliary mirror shell having a front and back side with a non-distorting mirror placed on the front side, and a connecting arm connected to the back side of the auxiliary mirror shell for attaching the mirror shell to the main rear view mirror.

In turn, the connecting arm further comprises a ball joint pivot at substantially one end of the connecting arm and attached to the mirror shell. This provides for angular rotation of the auxiliary mirror shell in the left and right, as well as the up and down tilt position. A spring loaded clamp is placed at substantially the end of the connecting arm opposite the ball joint pivot, for attachment of the connecting arm and the auxiliary mirror shell to the main rear view mirror. Furthermore, the connecting arm has circumferential rotation means, so that the mirror shell can be rotated circumferentially around the clamp in substantially the same plane as the clamp. The rotation means comprises a recessed cavity within the connecting arm inside which a cylindrical rod rests, and rotation is achieved by turning the connecting arm around the cylindrical rod. The recessed cavity and cylindrical rod can be placed at any point along the connecting arm, however it is preferred that the recessed cavity is placed substantially at the end of the connecting arm opposite of the ball joint pivot. This will yield a greater distance of movement of the mirror assembly, thus providing an easy way for the mirror assembly to be moved from the path of a sun visor.

In another embodiment, a non-distorting auxiliary rear view mirror comprises an auxiliary mirror shell having a front and back side with a non-distorting mirror placed on the front side. A connecting arm of the auxiliary mirror has a first elongated portion connected to the back side of the auxiliary mirror shell through a ball joint pivot at substantially one end of the first elongated portion of the connecting arm for angular rotation of the auxiliary mirror shell. Additionally, a second elongated portion has a spring loaded clamp attached to the main rear view mirror at substantially one end of the second elongated portion. A swivel hinge which connects the first elongated portion of the connecting arm at substantially the end opposite the ball joint pivot, to the second portion of the connecting arm at substantially the end opposite the spring loaded clamp and which defines a swivel hinge axis. The swivel hinge axis is vertically parallel to the plane of the main rear view mirror surface, and thus, the auxiliary mirror shell can be swivelled to fold over the main rear view mirror. In a different embodiment, the second connecting arm has a circumferential rotation means having a recessed cavity and a cylindrical rod.

In yet another embodiment of the invention, the vision enhancing assembly comprises an auxiliary mirror shell having a front and back side with a non-distorting mirror placed on the front side. The mirror is attached to the mirror shell through a ball joint pivot for angular rotation of the mirror. A connecting arm is connected to the back side of the auxiliary mirror shell for attaching the mirror shell to the main rear view mirror by means of an adjustable clamp. The connecting arm further comprises a first elongated portion for attachment to the auxiliary mirror, a second elongated portion for attachment to the main rear view mirror, and hinge means, such as a swivel hinge, for connecting the first elongated portion to the second elongated portion to define a swivel hinge axis. Adjustable clamping means is placed substantially at one end of the second elongated portion opposite the hinge means, for attachment and removal of the auxiliary mirror from the rear view mirror. The axis of the swivel hinge is perpendicular to the length of the main rear view mirror.

The adjustable clamping means further comprises a threaded rod having a knob, and clamp attachment sites, wherein upon turning the knob to thread in the rod, clamp attachment sites are drawn towards each other to clamp down on the frame of the central rear view mirror, and upon turning the knob in the opposite direction, clamp attachment sites are separated from each other to release the central rear view mirror.

In other embodiments of the invention the non-distorting mirror is a flat mirror. In yet another embodiment of the invention, the non-distorting mirror is preferably tinted.

In operation, the auxiliary mirror assembly is attached to an existing main rear view mirror of an automobile using the spring loaded clamps. It is convenient to have such clamps for attachment as it is easy to adjust the position of the auxiliary mirror assembly by simple operation of the clamps to release the auxiliary mirror from the main rear view mirror, and move the auxiliary mirror to any point along the length of the main rear view mirror. Alternatively, an adjustable clamp using a threaded rod and knob can be used. After the auxiliary mirror is placed in proper position, then the ball pivot joint can be used to adjust for the proper angular adjustment of the mirror, including the up and down tilt.

When sun visors are needed, the auxiliary mirrors can be circumferentialy rotated to a position below, and in the same plane as the main rear view mirror. The sun visor can be brought down, and then the auxiliary mirror can be circumferentialy rotated back up to its desired position. Conversely, should the driver desire to place the sun visor back to its non-use position, this convenient movement of the auxiliary mirror can be repeated.

In other embodiments of the invention, the auxiliary mirror is folded over the rear view mirror, the sun visor is taken to its desired position, and thereafter, the auxiliary mirror is placed back in proper position for viewing the rear of the automobile.

There is clearly a need for a safe, effective, and affordable means for eliminating or reducing blind spots for rear view mirrors. Such a solution should not only be effective but it must be efficient to manufacture, cost effective to produce, and operable in conjunction with other automobile parts. It must also be easy to adapt for use in retrofitting the many different existing rear view mirrors currently in use.

The invention is significantly advantageous over the prior art in that it enables a driver to retain a comfortable, forward posture without having to repeatedly twist the head and neck to glance over the shoulder and enables a motorist to keep their eyes safely focused on the road ahead. Additionally, the invention attaches to the existing main rear view mirror of an automobile, augmenting the function of the rear view mirror, while preserving the full use and function of the standard rear view mirror. The invention will adapt to any car's rear view mirror by snapping onto it without any tools, or removing any existing car parts. Furthermore, the design of the invention uses minimum injection molding, assembly parts and assembly steps to ensure low molding costs and cost-efficient manufacturing. The invention also fits all automobiles, and permits its use in conjunction with an automobile's sun visor.

BRIEF DESCRIPTION OF THE DRAWINGS

FIG. 1 is a front view of a first embodiment of the assembly of the invention in conjunction with the main rear view mirror.

FIG. 2A is a rear view of the first embodiment of the assembly of the invention in conjunction with the main rear view mirror.

FIG. 5A and 5B are front and back views of an embodiment of the invention employing a swivel hinge for folding the auxiliary mirror over the main rear view mirror.

FIG. 6A and 6B show a back view and cross section of the adjustable clamping means.

FIG. 6C and 6D are top views of the ball joint pivot and swivel hinge which provide angular and lateral movement for the auxiliary mirrors.

FIG. 6E is a side cross section view of the swivel hinge connecting the first and second elongated portions of the connecting arm.

FIG. 6F is a bottom view of the swivel hinge connecting the first and second elongated portions of the connecting arm.

FIG. 7A and 7B are views of an embodiment of the invention showing how the auxiliary mirrors can be folded over the main rear view mirror.

DETAILED DESCRIPTION OF THE INVENTION

Turning now to FIGS. 1 through 4, the assembly of the invention will now be described.

Figure 2B:
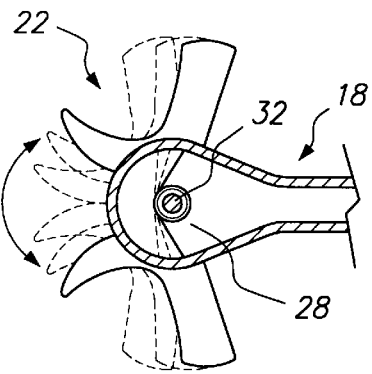
FIG. 2B is a cross section view of the spring/lever/clamp mechanism of the spring loaded clamp.
Figure 2C:
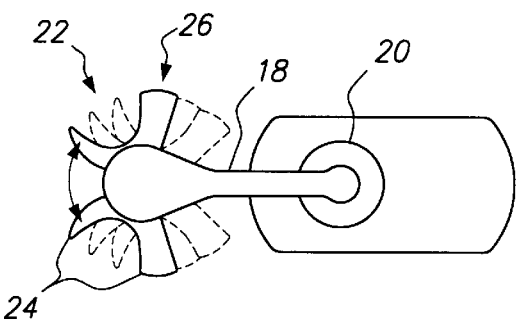
FIG. 2C is a rear view of the spring/lever/clamp mechanism in operation.

In FIG. 1 and 2, a front view of a non-distorting auxiliary rear view mirror assembly 12 and its use in conjunction with an existing main rear view mirror of an automobile 10. The auxiliary mirror assembly 12 comprises an auxiliary mirror shell 14 which holds an auxiliary mirror 16, and a connecting arm 17. The connecting arm 17 in turn has a ball joint pivot 20 at one end for attachment to the auxiliary mirror shell 14, and a spring loaded clamp 22 at the end opposite the ball joint pivot 20. The spring loaded clamp comprises of an upper and lower clamp handles 24, upper and lower clamp levers 26, and clamp lever gripping portions 28, such that squeezing the upper and lower clamp handles 24 towards each other will separate the upper and lower clamp levers 26. A circular spring 27 is used to provide resistance to squeezing the upper and lower clamp handles 24 together. Therefore, upon release of the upper and lower clamp handles 24 the spring is continuously pushing the upper and lower clamp levers 26 towards each other. This provides for the upper and lower clamp levers to grip onto the existing main rear view mirror 10 after the clamp lever gripping portions 28 are brought in a position to grip the main rear view mirror 10.

Figure 3B:
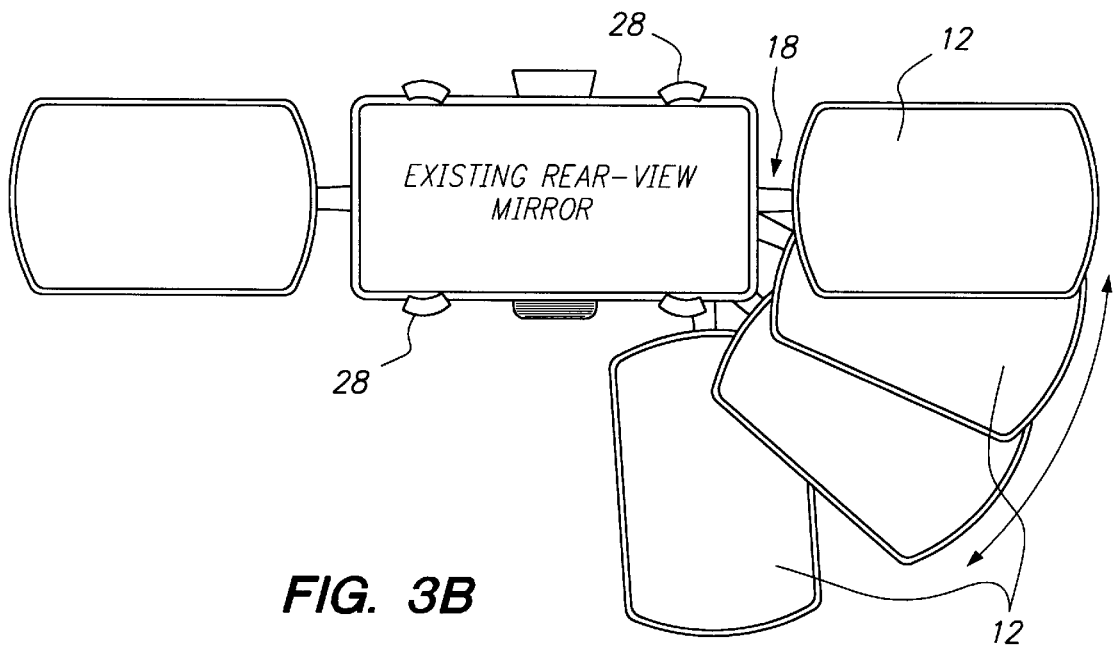
FIG. 3B is a front view of the invention showing the circumferential rotation of the auxiliary mirror in operation.
Figure 3A:
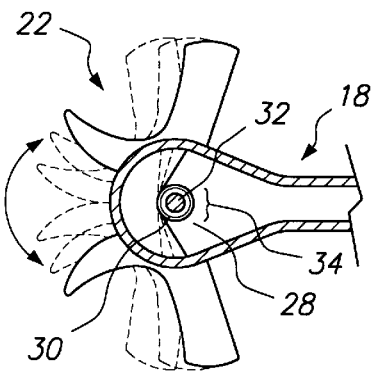
FIG. 3A is a cross sectional view of the circumferential rotation means of the invention.
Figure 4:
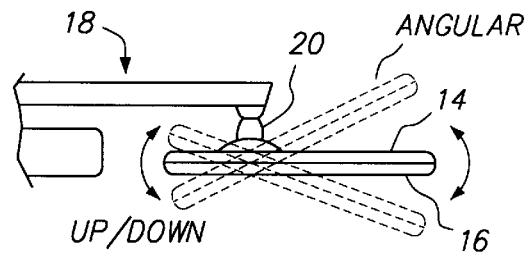
FIG. 4 is a top view of the a first embodiment of the assembly of the invention showing the ball joint pivot provide the auxiliary mirror with a left and right as well as an up and down tilt movement of the auxiliary mirror shell.

FIG. 3A shows a cross section of the circumferential rotation means 34 having a recessed cavity 30 and a cylindrical rod 32. FIG. 3B shows how this provides for circumferential rotation of the connecting arm 18 in the same plane as the spring loaded clamp 22. Therefore, the auxiliary mirror shell 14 will move in an arc length, when it is moved and where the cylindrical rod 32 is the center of the circle and the connecting arm 18 is the radius of the circle created by the arc length of movement of the auxiliary mirror shell 14. The structure of a ball joint pivot is well know in the art, and thus it can be seen in FIG. 4 how the auxiliary mirror shell 14 can be rotated angularly or in the up and down tilt position for proper adjustment of the mirror.

Turning now to FIG. 5–7, another embodiment of the invention is described. In FIG. 5A and 5B, a front and back view of a non-distorting auxiliary rear view mirror assembly 112 and its use in conjunction with an existing main rear view mirror of an automobile 110. The auxiliary mirror assembly 112 comprises an auxiliary mirror shell 114 which holds an auxiliary mirror 116, a connecting arm 117. The connecting arm 117 in turn comprises a first elongated portion 118 and a second elongated portion 119. The first elongated portion 118 has a ball joint pivot 120 at substantially one end of the first elongated portion 118 for attachment to the auxiliary mirror shell 114. A spring loaded clamp 122 is placed at substantially one end of the second elongated portion 119 for attachment to the main rear view mirror. The spring loaded clamp comprises of an upper and lower clamp handles 124, upper and lower clamp levers 126, and clamp lever gripping portions 128, such that squeezing the upper and lower clamp handles 124 towards each other will separate the upper and lower clamp levers 126. The axis of the clamp runs parallel to the length of the main rear view mirror. A circular spring 127 is used to provide resistance to squeezing the upper and lower clamp handles 124 together. Therefore, upon release of the upper and lower clamp handles 124 the spring is continuously pushing the upper and lower clamp levers 126 towards each other. This provides for the upper and lower clamp levers to grip onto the existing main rear view mirror 110 after the clamp lever gripping portions 128 are brought in a position to grip the main rear view mirror 110. Finally, the fist elongated portion 118 and second elongated portion 119 are attached to each other through a swivel hinge 150. The axis of the swivel hinge 160 is perpendicular to the axis of the adjustable clamp 122.

FIG. 6B is a cut away view of the spring clamp. It can be seen in FIG. 6C how the auxiliary mirror shell 114 can be rotated angularly or in the up and down tilt position for proper adjustment of the mirror by means of the ball joint 120. FIG. 6D shows how the connecting arm 118 can be adjusted at the location of the swivel hinge 150 to move the auxiliary mirror out of the path of the sun visor.

FIG. 6E and FIG. 6F show, respectively a side view of the swivel hinge 150 and a top view of the swivel hinge 150.

Figure 7A:
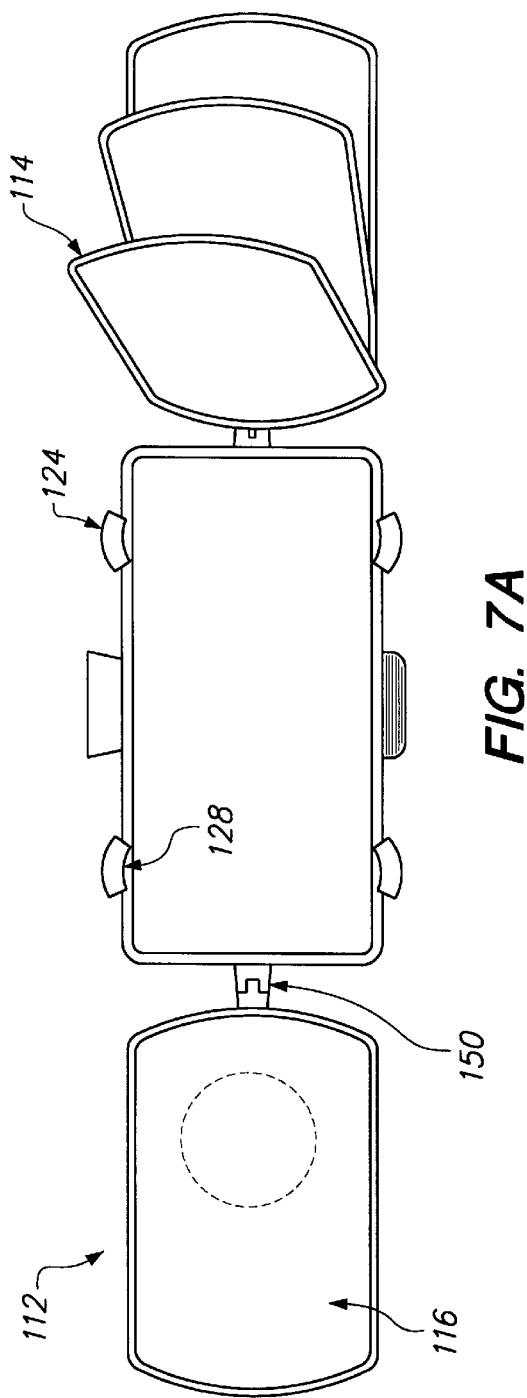
Figure 7B:
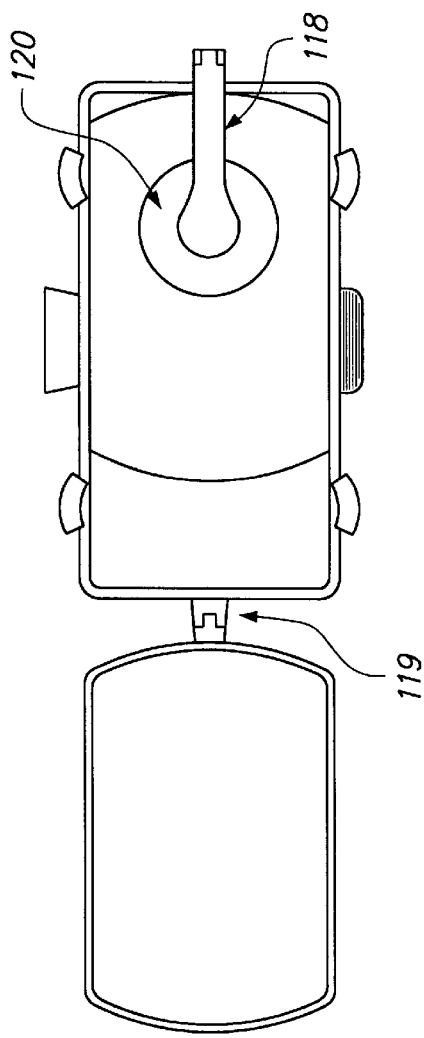
FIG. 7B is the same embodiment shown in closed position.

FIG. 7A and FIG. 7B shows how the auxiliary mirrors can be swivelled over the central rear view mirror so that the sun visors may be adjusted downward.

Figure 8A:
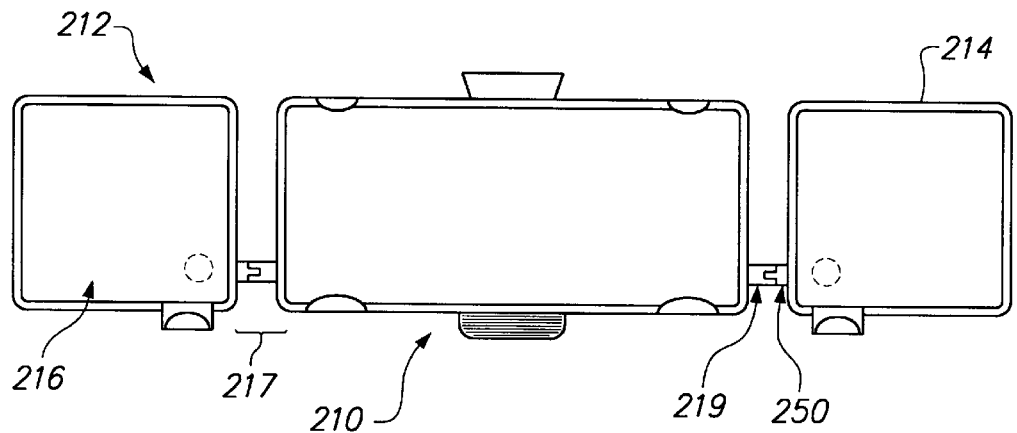
FIG. 8A–8C are front, back, and side views of another embodiment of the invention using a threaded rod and knob adjustable clamp.
Figure 8B:
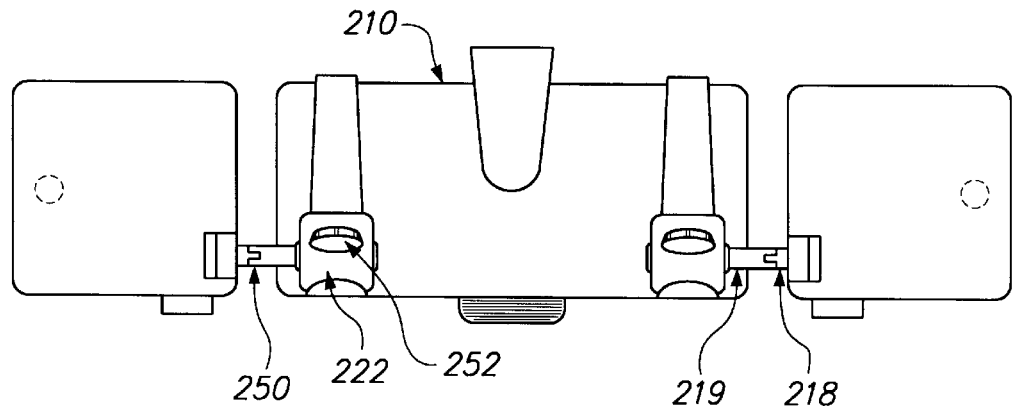
Figure 8C:
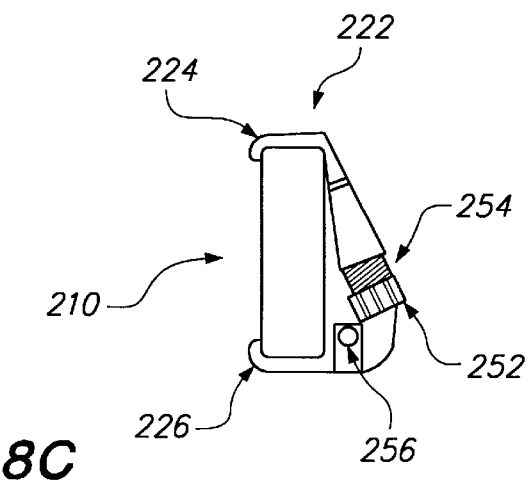
Figure 9A:
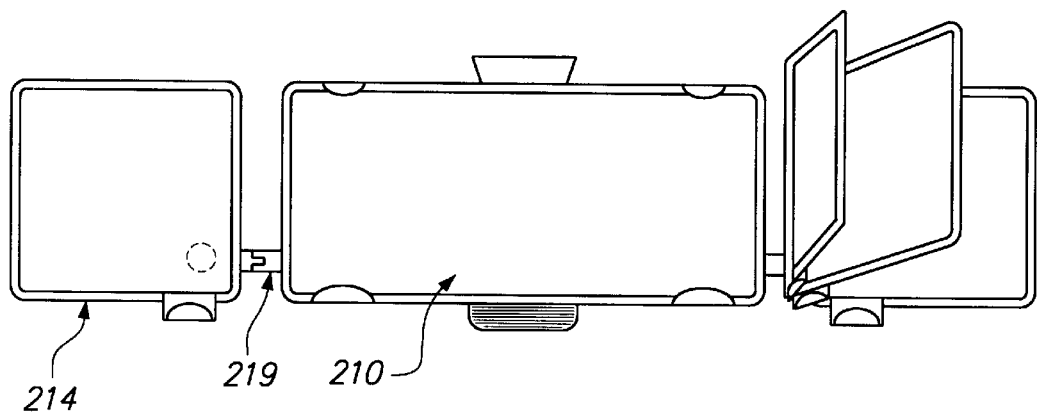
FIG. 9A–9C are front views of the embodiment of the invention shown in FIG. 8 during operation. using a threaded rod and knob adjustable clamp.
Figure 9B:
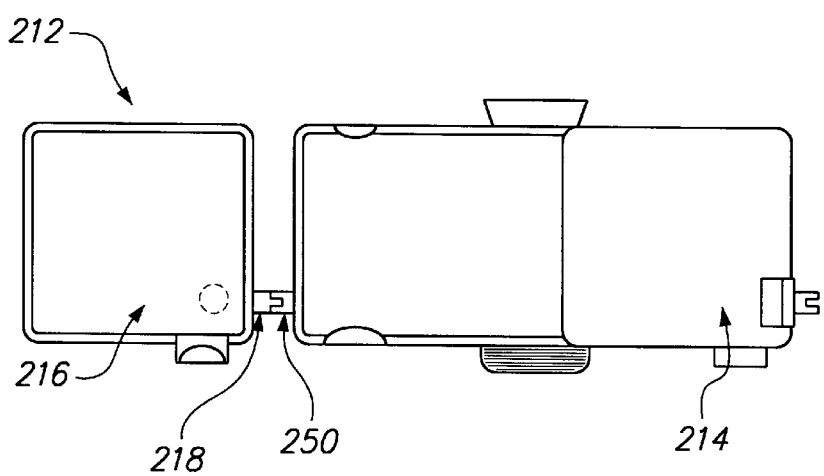
Figure 9C:
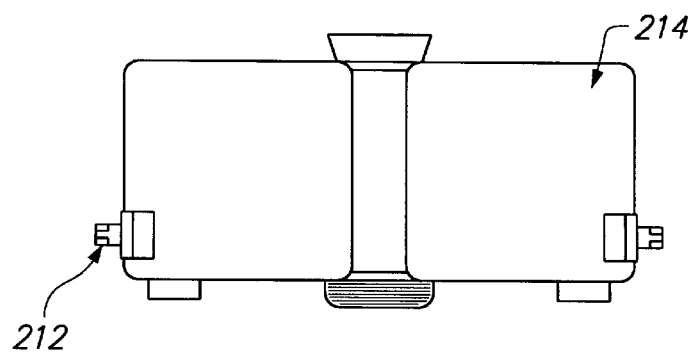

Turning now to FIG. 8–9, yet another embodiment of the invention is described. In FIG. 8A–8C, a front, back and side view of a non-distorting auxiliary rear view mirror assembly 212 and its use in conjunction with an existing main rear view mirror of an automobile 210. The auxiliary mirror assembly 212 comprises an auxiliary mirror shell 214 which holds an auxiliary mirror 216, a connecting arm 217. The connecting arm 217 in turn comprises a first elongated portion 218 and a second elongated portion 219. The auxiliary mirror 216 is attached directly to the auxiliary mirror shell 214, which is attached to the first elongated portion of the connecting arm by means of a pivot joint. An adjustable clamp 222 is placed at substantially one end of the second elongated portion 119 for attachment of the auxiliary mirror assembly 212 to the main rear view mirror. The adjustable clamp 222 comprises of a threaded knob 252, a threaded rod 254, and clamp gripping portions 224 and 226. By turning the knob 252 to thread in or our the threaded knob 254, the gripping portions 224 and 226 are either drawn towards each other or separated from each other. This mechanism is well known in the art and is not described in detail. FIG. 9A–C shows this embodiment during operation.

A suitable material for manufacturing the body of the auxiliary mirror shell and connecting arm is plastic, preferably of light weight. Suitable types of mirrors for placement in the auxiliary mirror shell are flat mirrors and tinted mirrors.

From the foregoing, it will be appreciated how the objects and features of the invention are met. The invention is significantly advantageous over the prior art in that it provides for the first time mechanically efficient, yet effective means for reducing or altogether eliminating driving blind spots. The simple construction of the invention translates not only into significant production cost savings, thereby lower cost to the consumer, but also makes possible the use of it in conjunction with an automobile's sun visor.

Although the invention has been described with respect to a particular auxiliary rear view mirror, it will be appreciated that various modifications of the apparatus and method are possible without departing from the invention, which is defined by the claims set forth below.

What is claimed is:

1. A non-distorting auxiliary rear view mirror vision enhancing assembly which attaches onto an existing automotive interior main rear view mirror, wherein said existing main rear view mirror having a mirror shell with a front and backside; a mirror placed on the front side and a connecting arm extending from the backside, said vision enhancing assembly comprising:
   a) an auxiliary mirror shell having a front and back side with a non-distorting mirror placed on the front side; and
   b) said connecting arm having a first end and a second end, wherein the first end is connected to the back side of the auxiliary mirror shell for attaching the auxiliary mirror shell to the main rear view mirror, and the second end is connected directly to the backside of said existing main rear view mirror, the connecting arm further comprising:
      i) a ball joint pivot at substantially said first end of the connecting arm and attached to the back side of the auxiliary mirror shell, for angular rotation of the auxiliary mirror shell;
      ii) a spring loaded clamp substantially at said second end of the connecting arm opposite the ball joint pivot for attachment of the connecting arm to the main rear view mirror for easy removal and attachment of the auxiliary rear view vision enhancing assembly to the main rear view mirror; and
      iii) circumferential rotation means, wherein the auxiliary mirror shell can be rotated circumferentially by said rotation means around the clamp in substantially the same plane as the clamp.

2. The assembly of claim 1 wherein the circumferential rotation means comprises a recessed cavity within the connecting arm inside which a cylindrical rod rests, wherein rotation is achieved by turning the connecting arm around the cylindrical rod.

3. The assembly of claim 2, wherein the recessed cavity is substantially at one end of the connecting arm.

4. The assembly of claim 3 wherein the non-distorting mirror is a flat mirror.

5. The assembly of claim 3 wherein the non-distorting mirror is tinted.

6. A non-distorting auxiliary rear view mirror vision enhancing assembly which attaches onto an existing automotive interior main rear view mirror, wherein said existing main rear view mirror having a mirror shell with a front and backside; a mirror placed on the front side and a connecting arm extending from the backside, said vision enhancing assembly comprising:
   a) an auxiliary mirror shell having a front and back side with a non-distorting mirror placed on the front side; and
   b) said connecting arm having a first end and a second end, wherein the first end is connected to the back side of the auxiliary mirror shell for attaching the auxiliary mirror shell to the main rear view mirror, and the second end is connected directly to the backside of said existing main rear view mirror, the connecting arm further comprising:
      I) a ball joint pivot at substantially said first end of the connecting arm and attached to the auxiliary mirror shell, for angular rotation of the auxiliary mirror shell;
      ii) a spring loaded clamp substantially at said second end of the connecting arm opposite the ball joint pivot for attachment of the connecting arm to the main rear view mirror for easy removal and attachment of the auxiliary rear view vision enhancing assembly to the main rear view mirror; and
      iii) a recessed cavity within the connecting arm, the recessed cavity holding a cylindrical rod, wherein circumferential rotation of the auxiliary mirror shell in the same plane as the spring loaded clamp is achieved by turning the connecting arm and the recessed cavity around the cylindrical rod.

* * * * *